United States Patent Office 3,205,274
Patented Sept. 7, 1965

3,205,274
BACTERICIDE
Victor Mark, Olivette, Mo., assignor to Monsanto Company, a corporation of Delaware
No Drawing. Filed Dec. 28, 1960, Ser. No. 78,815
1 Claim. (Cl. 260—648)

The invention relates to new chemical compounds having valuable properties as pesticides and particularly as bacteriostats and to methods for their synthesis. The invention is also directed to the synthesis of intermediates useful in the preparation of active biological toxicants.

The new chemical compounds have the general structure

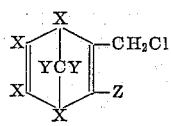

wherein X is selected from the group consisting of chlorine, bromine, fluorine and iodine; wherein Y is selected from the group consisting of hydrogen, alkoxy and X; and wherein Z is selected from the group consisting of chloromethyl, hydrogen and X.

The new compounds have useful germicidal properties, and particularly have the ability to inhibit the growth of the microorganism, *Staphylococcus aureus*. For this reason they have valuable utility as soap bacteriostats. The new compounds can be used as intermediates in the preparation of other chlorinated polynuclear compounds.

The new compounds are prepared by adducting a halocyclopentadiene with 3-chloro-1-propyne or 1,4-dichloro-2-butyne of the structure $$ClCH_2—C\equiv C—Z$$

wherein Z may be any radical selected from the class consisting of hydrogen, bromine, chlorine, fluorine and iodine. Z may also be chloromethyl when 1,4-dichloro-2-butyne is used.

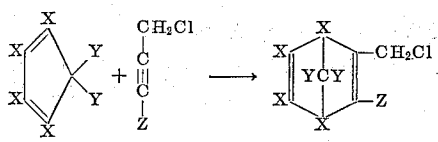

These reactants are mixed in approximately equimolar proportions and heated, for example, from 50° C. to 200° C. for a sufficient period of time to effect the desired degree of conversion. Periods of time from one hour to as high as 50 hours may be required. By conducting the synthesis under optimum conditions yields of the desired product from 90% to substantially quantitative can be obtained. Further details of the procedures are set forth with respect to specific examples as follows:

EXAMPLE I 1,2,3,4,7,7-hexachloro-5(chloromethyl)-2,5-norbornadiene

Hexachlorocyclopentadiene, 136.4 g. (0.5 mole) charged to a 500 ml. 3-neck flask provided with a mechanical stirrer, thermometer, dropping funnel and reflux condenser, was heated to 150° C. 3-chloro-1-propyne 37.3 g. (0.5 mole) was added slowly to the well stirred diene, during the course of 30 hours, while maintaining the temperature of the mixture close to 150° C. Distillation of the product yielded a smaller amount of starting materials and a 77% conversion to the adduct, which distilled between 108 and 109° C. and at 0.7 mm. and had $n_D^{25}$ 1.5652:

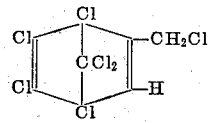

The product 1,2,3,4,7,7-hexachloro-5(chloromethyl)-2,5-norbornadiene, was also identified by elemental analysis (Cl percent, theory: 71.46; found: 71.50) and by infrared spectroscopy (maxima at: 6.14, 6.26, 7.00, 7.97, 8.36, 8.72, 9.00, 9.48, 9.66, 9.91, 10.44, 11.12, 11.77, 12.34, 12.57, 13.51, 13.82, 14.85μ).

EXAMPLE II 1,2,3,4,7,7-hexachloro-5,6,-bis(chloromethyl)-2,5-norbornadiene

A mixture of hexachlorocyclopentadiene, 54.6 g. (0.2 mole) and 24.6 g. (0.2 mole) of 1,4-dichloro-2-butyne was heated slowly up to 150° C. in a 200 ml. 3-neck flask, provided with stirrer, thermometer and reflux condenser, and was kept at this temperature for a period of 12 hours. On cooling to room temperature a portion of the product separated out in crystalline form. Filtration and recrystallization from methanol yielded white crystals, melting between 99 and 101° C. Workup of the filtrate by separation of the recovered starting materials by distillation and crystallization of the high boiling residue raised the conversion figure to 53% and the yield to an essentially quantitative one of the desired product:

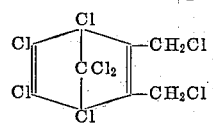

The adduct, 1,2,3,4,7,7-hexachloro-5,6,-bis(chloromethyl)-2,5-norbornadiene, was identified by correct elemental (chlorine percent, theory: 71.67; found: 71.08) and spectral analyses (infrared maxima at: 6.25, 6.95, 7.71, 8.02, 8.43, 8.72, 9.26, 9.87, 10.33, 11.04, 11.41, 12.68, 13.80 and 14.86μ).

EXAMPLE III 1,2,3,4,7,7-hexachloro-5(chloromethyl)-6-iodo-2,5-norbornadiene

A mixture of 27.3 g. (0.1 mole) of hexachlorocyclopentadiene and 20.0 g. (0.1 mole) of 3-chloro-1-iodo-1-propyne was reacted in the equipment described in the previous example by careful heating between 130 and 160° C. for a period of 6 hours. Fractionation of the resultant thick liquid yielded a small amount of starting materials and the desired adduct, 1,2,3,4,7,7-hexachloro-5-(chloromethyl)-6-iodo-2,5-norbornadiene, as a pale yellow oil boiling at 135–140° C. and 0.55 mm., and having $n_D^{25}$ 1.6222:

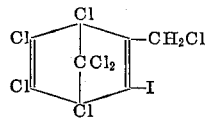

The product was identified by correct analysis (Cl percent theory: 52.45; found 53.02) and by infrared spectroscopy. Characteristic maxima occurred at: 6.21, 6.28, 7.02, 7.97, 8.11, 8.74, 9.24, 9.63, 9.93, 10.46, 11.05, 11.47, 13.38, 13.55, 14.41, 14.92 and 15.21μ.

An example of the use of the new compounds follows:

EXAMPLE IV

Bacteriostatic activity was demonstrated for 1,2,3,4,7,7-hexachloro-5(chloromethyl)-6-iodo-2,5-norbornadiene (test compound) by comparing it with hexachlorophene by a standardized bacteriological procedure. The test compound and hexachlorophene were prepared in a series of dilutions of 1:5T (thousand), 1:10T, 1:50T and 1:100T and 0.2 ml. of each of these solutions were added to different 9 ml. samples of sterile soap solution (5 g. of tallow soap (Ivory Snow) in 90 ml. of distilled water). Each soap solution was formulated with nutrient agar and the samples poured into Petri dishes and allowed to harden. The bacteria *Salmonella typhosa* was cultured in advance by inoculating an agar slant and incubating it for 24 hours at 37° C. A bacterial suspension was prepared by transferring the bacteria with a needle to 10 ml. of distilled water. Each of the agar test slants were inoculated with one drop of the suspension and the growth (+) or inhibition (−) were recorded.

| Dilution | 1:5T | 1:10T | 1:50T | 1:100T | 1:1M |
|---|---|---|---|---|---|
| Hexachlorophene | − | + | + | + | + |
| Compound of Ex. III | − | − | − | + | + |

The data shows that when hexachlorophene at dilutions of 1 part per 10,000 ceases to be an inhibition for growth of *Salmonella typhosa*. However, the compound of Example III still inhibits the bacterial growth at 1 part per 50,000 and ceases to be an inhibition at a dilution of one part per 100,000.

Most known bacteriostats are primarily effective against gram positive organisms and have little or no effect on the gram negative types. The compounds of this invention, although useful in their own right, may be combined with a gram positive bacteriostat in order to expand the spectrum of activity. The compounds of this invention may be used alone or in combination with other bacteriostats in the preparation of antiseptic detergents for washing clothes, dishes, silverware, walls, floors or any other surfaces requiring sterilization. In many cases the compounds are deposited on the clothing or surfaces washed so as to provide a sterile surface for a prolonged period of time. The compounds are also useful in the preparation of antiseptic cosmetic compositions, such as organic cleansing detergents, shaving creams, shaving soaps, shampoos or other compositions having surface active properties, which may be due to the basic composition or by virtue of a specific additional surface active compound included in the composition.

The word "detergent" is intended to include any agent which provides a cleaning action by reason of its surface active properties. These include alkali metal fatty acid soaps, for example, those prepared by the saponification of animal or vegetable oils. Other soaps such as rosin soaps and amine soaps are also included. The generic expression also includes synthetic cleansing compositions in which the surface active effect may be anionic, cationic or nonionic. Examples of the anionic detergents are the alkali metal sulfonates such as the long-chain alkyl substituted benzene sulfonate wherein the alkyl radical is from 12 to 18 carbon atoms, or other compounds having hydrophilic portions such as the alkali metal nucleus and hydrophobic groups such as the long-chain organic portion. Other compounds having both hydrophilic and hydrophobic characteristics are the cationic surface active agents, including the quaternary ammonium compounds such as tetramethyl ammonium chloride, the phosphorous salts and the sulphonium salts. The nonionic surface active agents include the molecules wherein the hydrophobic and hydrophilic radicals are separated by ether linkages such as the fatty alcohols having been condensed with a plurality of moles with ethylene or propylene oxides.

The organic detergents contemplated for use with bactericides are well within the province of one skilled in the detergent arts. Similarly, the formulators of other cosmetics, cleansing creams, shaving soaps, and shampoos can use the described compounds to provide an antiseptic agent effective in removing or destroying skin bacteria.

The embodiments of the invention in which an exclusive privilege or property is claimed are defined as follows:

1,2,3,4,7,7 - hexachloro - 5 - chloromethyl - 6 - iodo-2,5-norbornadiene.

References Cited by the Examiner
UNITED STATES PATENTS

| | | | |
|---|---|---|---|
| 2,809,937 | 10/57 | Gray | 252—106 |
| 2,931,777 | 4/60 | Shelanski | 252—106 |
| 2,951,098 | 8/60 | Hoch et al. | 260—648 |
| 2,951,099 | 8/60 | Hoch | 260—648 |
| 3,031,486 | 4/62 | Richter | 260—454 |
| 3,062,898 | 11/62 | Hoch | 260—648 |

LEON ZITVER, *Primary Examiner.*

JULIUS GREENWALD, ALPHONSO D. SULLIVAN, *Examiners.*